United States Patent [19]

Cheng

[11] Patent Number: 4,558,261

[45] Date of Patent: Dec. 10, 1985

[54] EXCLUSIVE PLUG FOR ARTISTIC TABLE LAMPS

[76] Inventor: Hsiang T. Cheng, 2F, No. 185, Nan Ya W Rd., Sec. 2, Pan Chiao City, Taipei Hsien, Taiwan

[21] Appl. No.: 579,934

[22] Filed: Feb. 14, 1984

[51] Int. Cl.$^4$ ............................................. H05B 37/02
[52] U.S. Cl. ................................ 315/209 R; 315/362; 315/DIG. 4; 307/116
[58] Field of Search ...................... 307/308, 116, 157; 315/362, DIG. 4, 209 R; 340/562

[56] References Cited

U.S. PATENT DOCUMENTS

| | | | |
|---|---|---|---|
| 3,992,634 | 11/1976 | Larson | 307/308 |
| 4,125,767 | 11/1978 | Silver | 315/DIG. 4 |
| 4,211,959 | 7/1980 | Deavenport et al. | 315/362 |

*Primary Examiner*—Harold Dixon

*Attorney, Agent, or Firm*—Armstrong, Nikaido, Marmelstein & Kubovcik

[57] ABSTRACT

An exclusive plug for artistic table lamps comprising main parts, namely a signal input line, two voltage output lines, a demagnetizing wire, a light-adjustment and switch-actuating operational circuit, and electric power indication light, of which the signal input line and two voltage output lines use a co-axial core cable, and a demagnetizing wire is provided around this three-core cable. The light adjustment and switch-actuation operational circuit is installed in the body of the plug, thus making the plug of this invention, when used in conjunction with a general artistic table lamp, convert the overall external surface of the common artistic table lamp stand into a touch induction surface. This device is completely applicable to the artistic table lamp, no matter whether the table lamp stand is made of a material of low induction coefficient like ceramics, pottery, marble, glass, wood, plastics etc., or even of metallic materials.

1 Claim, 8 Drawing Figures

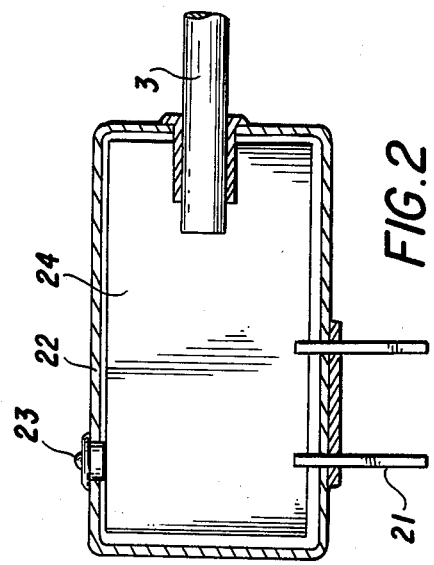
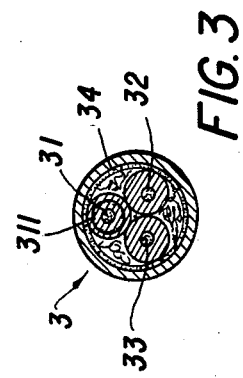
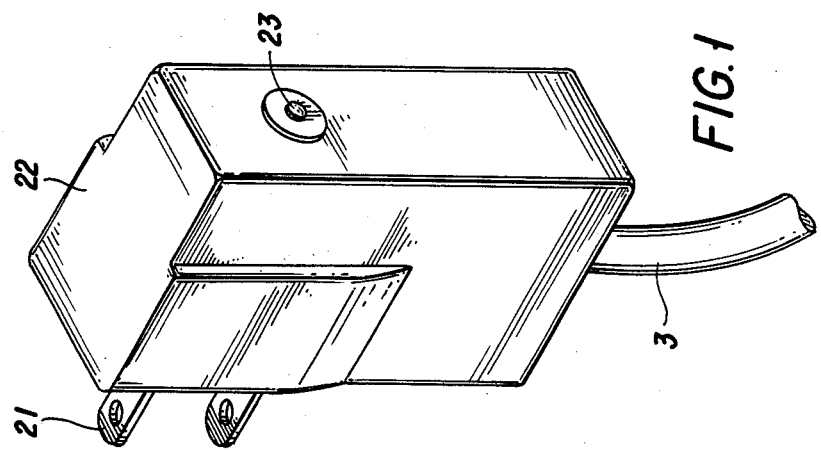

EXCLUSIVE PLUG FOR ARTISTIC TABLE LAMPS

BACKGROUND OF THE INVENTION

The requirements of the basic designs of common daily use articles are to match the habits, customs and nature of human life and to comply with the principles of human mechanics so as to convey to users an impression of convenience and of being ready for service during use. An earlier table lamp is operated by manipulation of a switch such as pressing, pulling or turning. In recent times, there are known designs for a touch switch of metal conduction plates actuated by means of static electricity and induction. The inventor has researched and developed an artistic table lamp with its entire external surface set as an induction-type brightness-adjusting switch, and this touch-induction switch surface is preferably made of a material, such as ceramic, pottery, marble, glass, wood, plastic, etc. of good quality feeling but having a low induction coefficient to improve the level of our life.

Of course, material articles will evolve along with the tide of times. So, articles with poor effect will be eventually eliminated. The inventor believes the operational way of the old-fashioned manually operated switch or metal plate static electric induction type switch of the artistic table lamp will be gradually replaced by the overall full-surface touch and electro-magnetic induction type. However, at present, there are hundreds of thousands of types of existing artistic table lamps. The existing molds of various table lamps have been deliberately designed for sale and to be competitive in the domestic and overseas markets, and should not be abolished in a careless manner. So, the motive and object of this invention are to study and create an exclusive plug for the artistic table lamp, to make this plug, when used in conjunction with the artistic table lamp in general in the market, set the entire external surface of the artistic table lamp stand in general as a touch-induction surface, whether this table lamp stand is made of a material having a low induction coefficient such as ceramic, pottery, marble, glass, wood, or plastic, or of metallic materials.

SUMMARY OF THE INVENTION

One feature of this invention is that it includes a three-core cable (one core is a signal input line and two cores are the voltage output lines), in which demagnetizing wires are provided around the signal input line and also the three-core cable, respectively, to eliminate the induced magnetic field generated by the electric current flowing through these cores.

Another feature of this invention is that an operational circuit for brightness-adjustment and switch-control action is disposed inside the plug body. Other features of this invention can be further understood after reading the following description with reference to the drawings.

BRIEF DESCRIPTION OF THE DRAWINGS

FIG. 1 is the perspective view of this invention.

FIG. 2 is the sectional view of this invention.

FIG. 3 is the sectional view of the cable in conjunction with this invention.

DETAILED DESCRIPTION OF THE INVENTION

Figure 4:
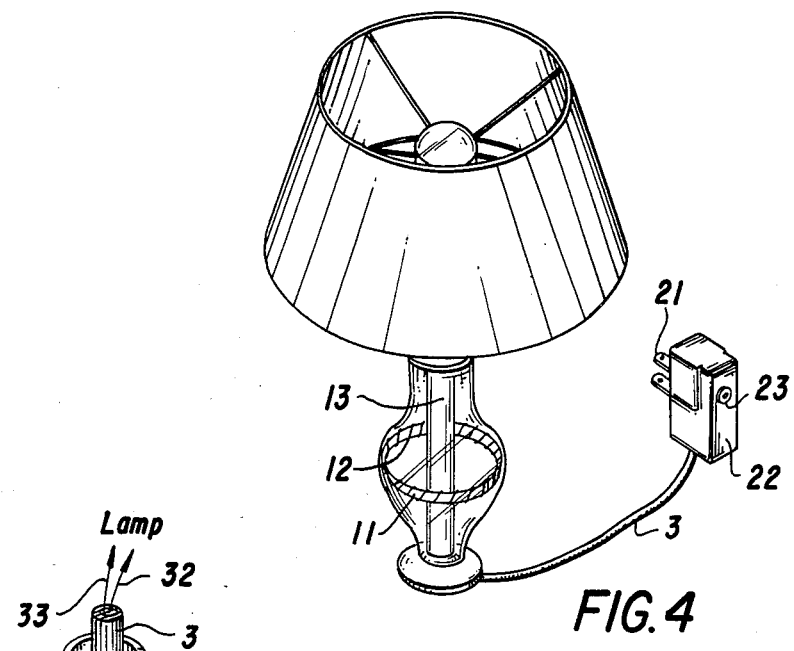
FIG. 4 is an examplary view of this invention applied to the artistic table lamp.

As shown in FIGS. 1, 2 and 3, this invention includes such main parts as plug 21, plug body 22, power indicator light 23, operational circuit and base plate 24 and cable 3, of which, cable 3 includes a signal input line 31 and two voltage output lines 32 and 33 set as three cores of the cable, and also includes a demagnetizing wire 34 set around the cores to eliminate the electromagnetic field caused by the electric current flowing through these three cores, and the signal input line 31 is provided with a demagnetizing wire 311 as shown in FIG. 3.

Figure 5:
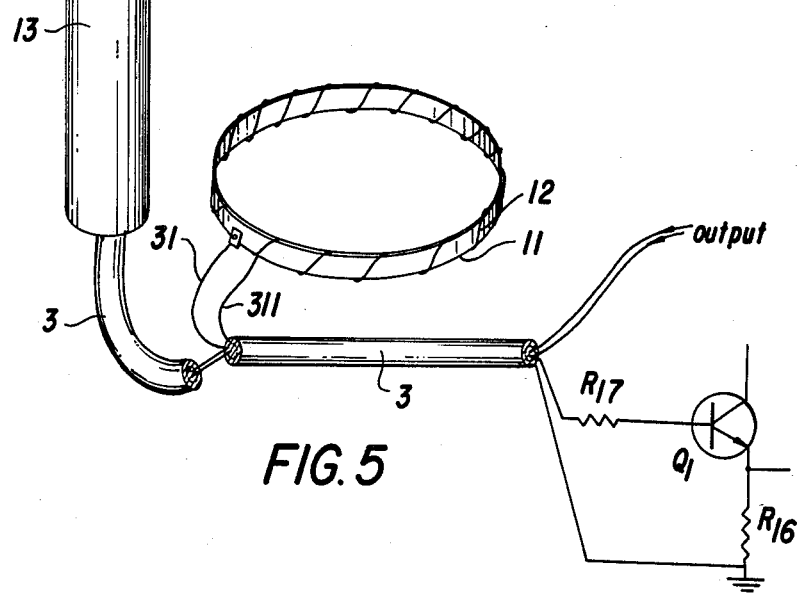
FIG. 5 is a wiring diagram of this invention applied to the artistic table lamp.

As for the artistic table lamp using this invention, the inner wall of the stand of the table lamp is provided with a properly shaped induction plate 11 in a close adjoining relation therewith. With reference to FIGS. 4 and 5, a demagnetizing wire 12 is wound around the outside of induction plate 11. Induction plate 11 is connected to the signal input line 31 in cable 3. Demagnetizing wire 12 wound on induction plate 11 is connected to demagnetizing wire 311 of cable 3, while output lines 32 and 33 are connected to the circuit and to the Lamp of the table lamp. These output lines 32 and 33 are pulled out from cable 3 and then connected as described after cable 3 has been passed through the metal pipe 13 and extended to the Lamp. When a user's hand touches and contacts the ceramics, pottery, glass, wooden, or plastics table lamp stand, the static charges on his body cause changes in the magnetic field of induction plate 11, thus influencing the base of transistor Q1 in the operational circuit to make this operational circuit work.

During the application of this invention, the demagnetizing design of induction plate 11 and the lines and cables causes their respective magnetic fields not to be mutually affected. Especially, the respective electromagnetic fields generated by various parts of induction plate 11 itself would never interfere with other parts, so induction plate 11 can be placed on the inner wall of the stand in a close adjoining relation therewith freely in correspondence with the external configuration of the table lamp stand, and therefore, after a critical induction value is properly set, and after the entire external surface 14 of the ceramic, pottery, marble, glass, wooden, or plastic table lamp socket is touched by the user's hand, this shall trigger on the light-adjustment and switch operational circuit to work efficiently.

The following two examples of the operational circuit are presented to further describe the present invention.

Figure 6:
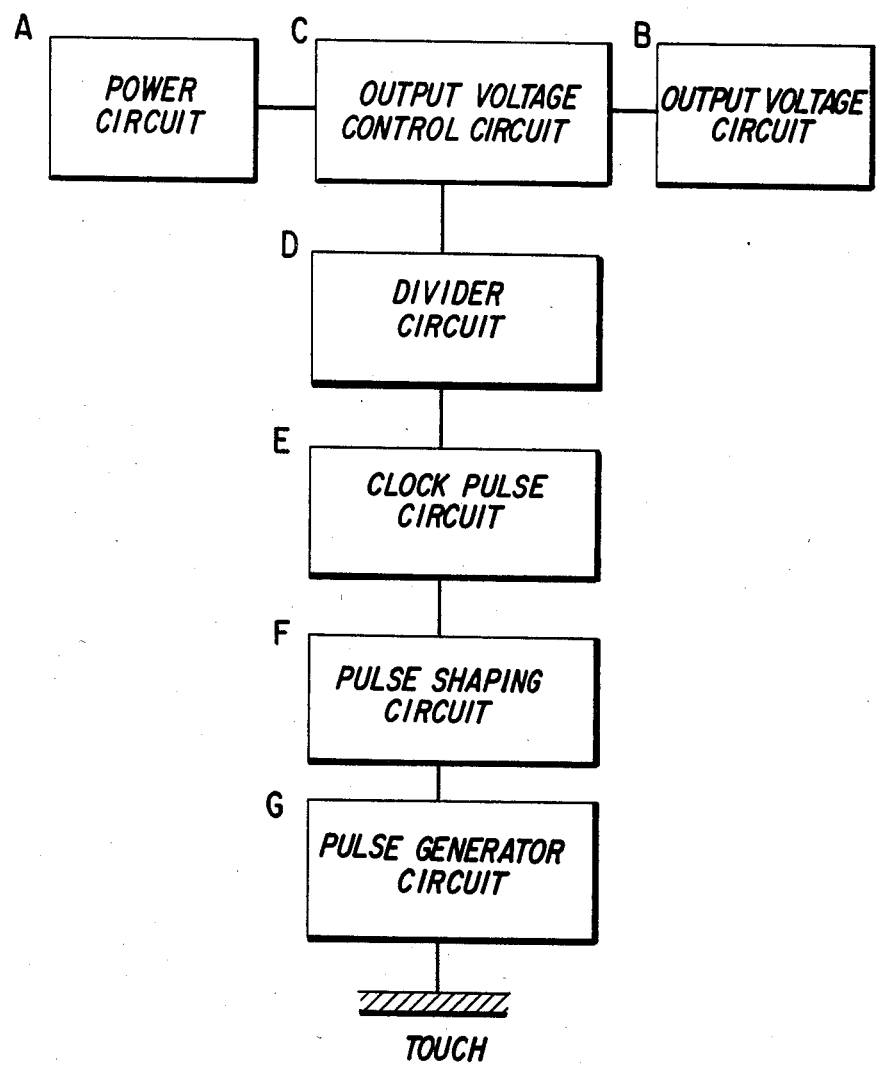
FIG. 6 is a block diagram of a first example of the operational circuit of this invention.
Figure 7:
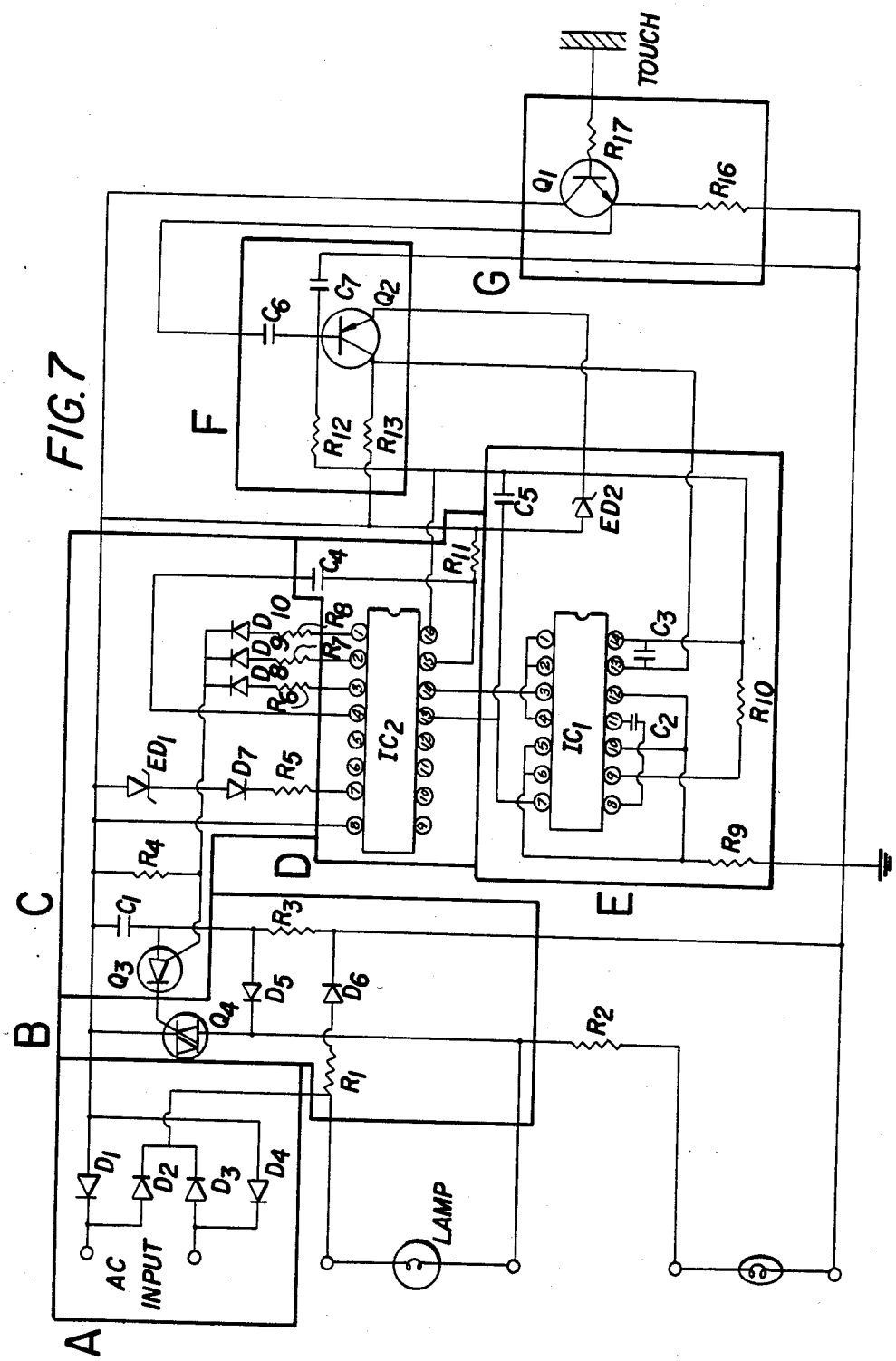
FIG. 7 is an examplary view of the operational circuit of this first example of the invention.

With reference to FIGS. 6 and 7, a first embodiment includes the main parts, namely, a power circuit A, output voltage control circuit C, output voltage circuit B, divider circuit D, clock pulse circuit E, shaping circuit F and generator circuit G. When and after the base of transistor Q1 in pulse generator circuit G is triggered on, the collector-emitter junction conducts a current and thus produces a pulse, but this pulse is unstable, and is then stabilized by transistor Q2 in pulse shaping circuit F to eliminate any interference waves and to have a stable shape, the pulse is output via the collector of transistor Q2, and input at terminal 13 of ICI (a 4001 IC may be used for IC1) of clock pulse circuit E, and then delayed and converted to produce a clock pulse which is output at terminal 3 of IC1. Whenever IC1 outputs a clock pulse, IC2 (a 4022 may be used for IC2) of divider circuit D outputs, at terminals 2, 1, 3, 7, and 4 in sequence, a voltage which is further set via five different resistance circuits, respectively, (This embodiment sets such divider voltages as Step 1, Step 2, Step 3, Step 4 and OFF), and then the gate terminal of semi-conductor Q3 of the output voltage control circuit C accepts such different voltages to cause its anode and cathode terminals (A and K) to conduct an electric current (due to different resistance, the output voltages of cathode K are also different), then the cathode of Q3 changes and controls the gate of Q4 of three-terminal silicon control converter TRIAC in the output voltage circuit B to respectively make Q4 conduct and output different voltages, thus making the load (the LAMP) operate as a very dim light, dim light, light, most bright light, or turn OFF, in sequence.

Figure 8:
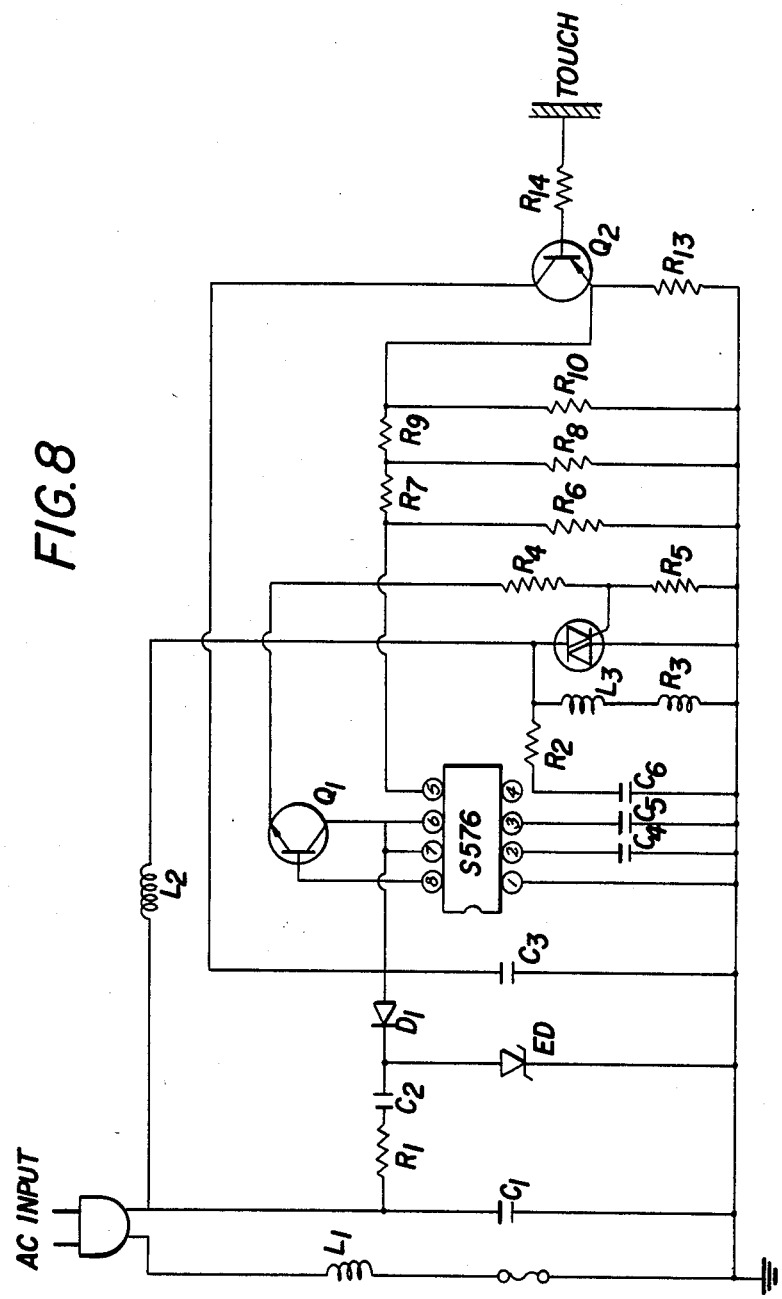
FIG. 8 is an examplary view of the operational circuit of a second example of this invention.

Referring now to FIGS. 8, this invention is also applicable to a stepless switch circuit. For instance, we can use an integrated circuit. Since such a circuit is beyond the scope of the present invention, no more elaboration about it is needed.

In summary, according to the above-disclosed contents, this invention can be used in conjunction with the existing artistic table lamp models by attaching appropriate induction plates and lines to them, so as to make the entire external surface of the table lamp stand be able to operate as a touch induction surface, no matter whether this stand is made of a material of low induction coefficient such as of ceramics, pottery, marble, glass, wood, plastic, or of metal; moreover, when this plug is used, no operational circuit need be provided in the original table lamp, such as in line or super thin type; undoubtedly, this invention is very helpful in raising the quality of human life.

I claim:

1. A power plug for use with artistic table lamps, comprising a plug means, plug body, power indicator light, operational circuit, base plate and cable means, wherein the cable means includes a three core line having one input signal line and two output voltage lines, demagnetizing wires being respectively provided on the outside of the input signal line and around said three core line, and said operational circuit is installed in said plug body.

* * * * *